Nov. 12, 1968 J. S. THOMPSON 3,411,007

RADIATION SENSITIVE OPTICAL SYSTEM FOR MATCHING COMPLEMENTARY CODES

Filed Oct. 27, 1964

INVENTOR
JAMES S. THOMPSON
BY
Allen M. Sutton
ATTORNEY 3,411,007
Patented Nov. 12, 1968

3,411,007
RADIATION SENSITIVE OPTICAL SYSTEM FOR MATCHING COMPLEMENTARY CODES

James S. Thompson, Los Angeles, Calif., assignor to The Bunker-Ramo Corporation, Stamford, Conn., a corporation of Delaware Filed Oct. 27, 1964, Ser. No. 406,779
13 Claims. (Cl. 250—219)

ABSTRACT OF THE DISCLOSURE

An optical system for comparing complementary first and second record-bearing mediums, each defining discrete opaque and light transmissive areas. The record-bearing mediums are superimposed between a light source and a light sensor so that no light is passed to the sensor if the record-bearing mediums match. In order to eliminate the effects of stray light, masks are utilized having openings smaller than the light transmissive areas of the record-bearing mediums. A diaphragm is used to eliminate diffracted light from reaching the sensor.

The Invention herein described was made in the course of or under a contract or subcontract thereunder, with United States Air Force, Rome Air Development Center.

This invention relates to optical systems and, more particularly, to an improved optical system in which a variable-opacity record-bearing medium defining a plurality of discrete light transmissive areas is optically matched with a variable-opacity reference record-bearing medium of similar but complementary character.

There are many instances in the field of information retrieval where it is desirable to match a coded piece of information, such as an abstract or the like, with a reference code in order to identify the particular piece of information desired. For example, it has been heretofore proposed that abstracts of information be stored on microfilm with the subject matter of each abstract being placed in coded form on a portion of the microfilm adjacent the abstract. One such proposal resulted in a machine known as the "Rapid Selector," which is described in some detail in the September 1949, issue of "Electronics," pages 122, 158–166. The machine used standard 35 mm. motion picture film on each reel of which can be stored up to 72,000 abstracts. When the information is microfilmed, a predetermined code pattern, consisting of black and white squares representing up to six seven-digit numbers, is simultaneously printed on the film. When it is desired to retrieve all abstracts relating to a particular subject, a reference card coded in accordance with the desired subject is sequentially matched against the codes recorded on the microfilm. In the particular machine being discussed, when matching codes are detected, a photograph is made of the abstract so identified for later inspection by the person using the machine.

Detection of a matching code condition, known as a "hit" is accomplished by optically matching the code carried on the microfilm with the code carried by the reference record-bearing medium, the two codes being complementary. By projecting the coded area of the microfilm on the coded reference record, and placing a photosensitive device behind the coded reference record, an absence of output from the photosensitive device will indicate a match between the two complementary codes. When using a code having a large number of discrete light transmissive and opaque areas, difficulty is encountered in that there is sufficient stray light in the system to prevent the photosensitive means from accurately discriminating between a "hit" or match condition and a mismatch of one or two areas. Therefore, it becomes necessary to utilize a number of photosensitive means, each of which is required to discriminate between a match and mismatch of perhaps only eight discrete areas. This, of course, increases the cost of the apparatus, the complexity of the optical system required, and its size.

It has been found that the principal sources of residual or stray light in a system of the type described are diffracted light originating at the edge of the objective lens utilized to image the coded record on the reference record, and light reflected back and forth between the surfaces of the objective lens. Furthermore, bubbles, seeds, striae and scratches on the objective lens, as well as any imperfect optical polish of the objective lens, contribute somewhat to the stray light. The present invention eliminates such stray light to an extent that a match or mismatch of over 100 discrete light transmissive areas can be detected accurately by a single photosensitive means.

The present invention is based on the realization that in a system of the type described virtually all stray or residual unwanted light can be prevented from reaching the photosensitive means by means of masks and a diaphragm located at certain positions in the optical system. A first mask is used to reduce in size each of the plurality of discrete light transmissive areas carried by the record-bearing medium which is to be optically matched with the reference record of similar but complementary character. A diaphragm is positioned in the optical system to eliminate the diffracted light originating at the edge of the objective lens of the system, and a second mask is utilized between the reference record-breaking medium and the photosensitive means to eliminate stray light due to other imperfections in the system and prevent it from reaching the photosensitive means.

The invention, together with further advantages and features thereof, will be better understood from the following description, taken in conjunction with the accompanying drawings, in which.

Figure 1:
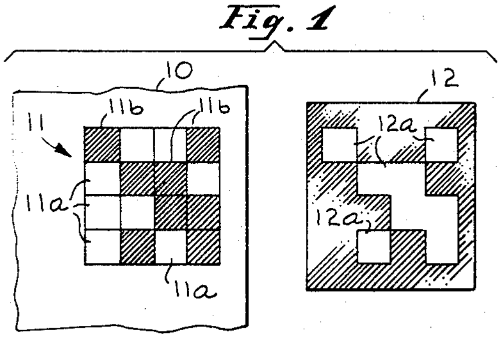
FIGURES 1 and 2 represent typical variable opacity record-bearing mediums having complementary light-transmissive areas thereon.

FIGURE 1 illustrates, in much simplified form, a pair of record-bearing mediums of the type that may be utilized in the optical system of the invention. One of the mediums may be a strip of microfilm 10, shown in fragmentary form, having thereon a code area 11. The code area 11 comprises a plurality of discrete light transmissive areas 11*a* and a plurality of opaque areas 11*b*. The code area 11 may be located on the microfilm adjacent to a photograph of an abstract or the like (not shown) which it is desired to identify by means of the particular code defined by the arrangement of light transmissive and opaque areas in the code area. The code carried in the code area 11 is to be optically matched in the system with a complementary code carried by a reference record-bearing medium 12. The reference record-bearing medium 12 is provided with a plurality of light transmissive areas 12*a* which correspond in location to the opaque areas 11*b* in the code area 11 on the film 10. The medium 12 may be a punched card, a piece of photographic film, or other material which is opaque except for the light transmissive areas 12*a*. Thus, if an image of the code area 11 is projected on the medium 12 (and properly registered), no light will be transmitted by the record-bearing medium 12. The code, of course, must be so designed that there are the same number of opaque areas 11*b* in each line in the code area 11 as there are light transmissive areas 12*a* in the record-bearing medium 12. Otherwise, an opaque area 11*b* could be projected upon an opaque area in the record-bearing medium 12 to indicate a match, when in fact, a mismatch occurred. Such techniques are well known in the art and no further explanation is deemed necessary.

Figure 2:
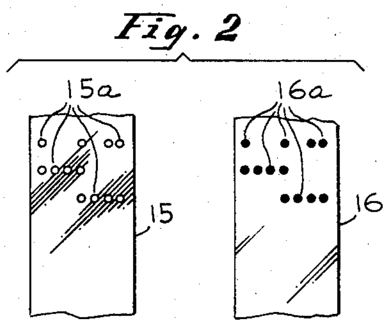

FIGURE 2 illustrates another pair of record-bearing mediums which may be used in the system of the invention, one being a punched paper tape 15 and the other being a film strip or other transparent medium 16. The paper tape 15 carries a code defined by a plurality of light transmissive holes 15*a* and the film 16, which is assumed to be the reference record-bearing medium, carries a complementary code defined by opaque spots 16*a*. It is apparent that if an image of the paper tape 15 is projected on the film 16 and properly registered, no light will be transmitted through the film strip 16. Again, it is pointed out that care must be exercised in designing the code so that an opaque area on the tape 15 cannot coincide with an opaque area on the film strip 16.

Figure 3:
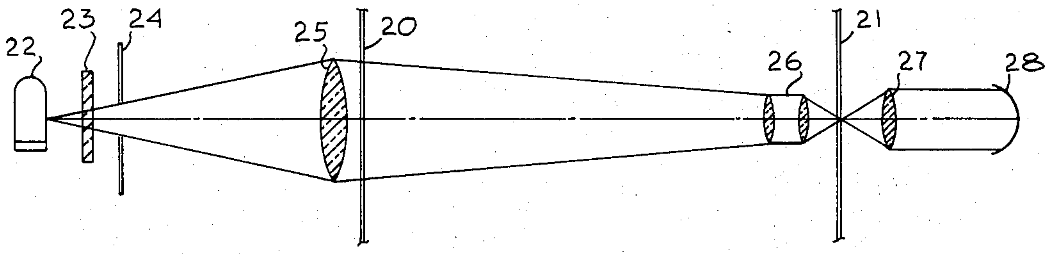
Fig. 3 PRIOR ART
FIGURE 3 is a diagram of a prior art system for matching complementary codes carried by mediums such as are shown in FIGURES 1 and 2.

FIGURE 3 illustrates diagrammatically a typical prior art optical system for matching two complementary codes of the types shown in FIGURES 1 and 2. As shown, a record-bearing medium 20 having a code thereon of the type previously discussed is to be matched with a reference record-bearing medium 21 carrying a complementary code. The optical system comprises a light source 22, the light from which is diffused by a ground glass 23. An aperture 24 restricts unwanted light, and a condenser lens 25 images the ground glass on the record-bearing medium 20 to evenly illuminate it. An image of the record-bearing medium 20 is formed on the reference record-bearing medium 21 by means of an objective lens system 26. Any light passing through the reference record-bearing medium 21 is collected by a condenser lens 27 and supplied to photosensitive means, such as a photocell 28. As previously pointed out, systems of the type shown in FIGURE 3 are adequate for discriminating between a match and a mismatch of the complementary codes carried by the members 20 and 21 when only a small number of light transmissive areas are involved in the codes. However, when the code involves a large number of conditionally light transmissive areas, there is sufficient stray light in the system to effectively mask the difference between a match and a mismatch involving one or two light transmissive areas.

Figure 4:
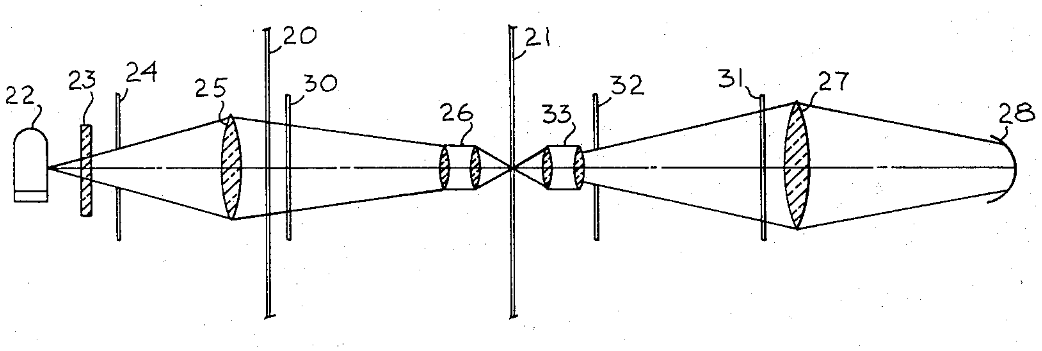
FIGURE 4 is a diagram of the improved optical system of the invention.

FIGURE 4 illustrates diagrammatically an optical system constructed in accordance with the teachings of the present invention. The same reference numerals have been used for elements of FIGURE 4 that are shown in FIGURE 3. As shown, the light source 22, ground glass 23, diaphragm 24 and condenser lens 25 provide means for evenly illuminating the record-bearing medium 20. An image of the record-bearing medium 20 is focused by the objective lens 26 on the reference record-bearing medium 21, and any light passing through the medium 21 is collected by the condenser lens 27 and provided to the photosensitive means 28. Stray or unwanted light in the system shown in FIGURE 4 is virtually eliminated by means of a first mask 30, a second mask 31, and a diaphragm 32. In addition, a relay lens 33 is provided between the reference record-bearing medium 21 and the diaphragm 32.

The basic operation of the embodiment of the invention shown in FIGURE 4 is generally similar to that of the optical system shown and described with reference to FIGURE 3. The light source 22, diaphragm 24 and condenser lens 25 evenly illuminate the record-bearing medium 20 and the objective lens 26 projects an image of the record-bearing medium 20 on the reference record-bearing medium 21. Any light passing through the reference record-bearing medium 21 is collected by the condenser lens 27 and illuminates the photocell 28. Thus, absence of an output from the photocell 28 indicates that the codes carried by the record-bearing mediums 20 and 21 are complementary and that no light is reaching the photocell. As previously pointed out, however, the present invention provides several important features not found in prior art devices, which greatly increase the utility of such a system.

One of the features of the invention resides in the use of the mask 30. That mask has a plurality of light transmissive areas therein positioned to correspond to the plurality of light transmissive areas defined by the record-bearing medium 20. Each of the areas in the mask 30, however, is smaller than a corresponding one of the transmissive areas in the record 20, and the transmissive areas in the mask 30 are positioned to correspond to all possible positions of light transmissive areas in the record-bearing medium 20. The mask 30 may be placed quite close to the record-bearing medium 20 with the transmissive areas in the mask reducing the effective diameter of the transmissive areas in the record-bearing medium 20 to a little less than half their full diameter. For example, if the medium 20 is a punched paper tape, such as shown in FIGURE 2, generally the diameter of each of the openings in the tape is approximately .07 inch. It has been found in practice that it is preferable, in that case, to have the openings in the mask 30 about .032 inch in diameter. Of course, when utilizing different arrangements and different sizes of light transmissive areas on the record-bearing medium 20, the sizes of the openings or light transmissive areas in the mask 30 must be determined somewhat empirically.

A second feature of the invention resides in the provision of the mask 31. The mask 31, like the mask 30, has a plurality of light transmissive areas positioned to correspond to all possible positions of the light transmissive areas defined by the record-bearing medium 20. As previously explained, an image of the record-bearing medium 20 is formed by the objective lens 26 on the reference record-bearing medium 21. An image of the reference record-bearing medium 21 is then formed on the mask 31 by means of the relay lens 33. The condenser lens 27 collects all light passing through the mask 31 and projects it upon photosensitive means 28.

It has been found in practice that by using the masks 30 and 31 the ratio of the amount of light reaching the photosensitive means 28 with a mismatch of one area to the amount of light reaching the photosensitive means under a matched condition is increased many times over that of a system not using the masks. Nevertheless, the masks do not eliminate to the desired degree stray light in the system due to light diffracted at the edge of the objective lens 26. Such stray light is, however, effectively eliminated by means of the diaphragm 32 placed between the relay lens 33 and the mask 31.

As previously mentioned, the relay lens 33 images the reference record-bearing medium 21 on the mask 31. However, it also images the objective lens 26 at a position between the relay lens 33 and the mask 31. It is at that position that the diaphragm 32 is placed. By making the aperture in the diaphragm 32 of a diameter approximately three-quarters that of the diameter of the aperture of the objective lens 26, virtually all stray light in the system is removed. The diaphragm 32 removes a bright annulus of light that is otherwise present in the system due to diffracted light originating at the edge of the objective lens 26 when a match occurs. It has been found that if such diffracted light can be removed, the remaining stray light due to other imperfections in the objective lens is not sufficiently great to be disturbing. By utilizing the teachings of the invention, it has been found that a match or mismatch can be detected reliably between record-bearing mediums having as many as 100 or more discrete light transmissive areas. This is far in excess of the number that could be detected using systems heretofore known.

Although a specific embodiment of the invention has been illustrated and described, it is apparent that many changes and modifications may be made thereto by one skilled in the art. For example, the record-bearing medium 20 and the reference record-bearing medium 21 may be interchanged; modifications may be made in the means for illuminating the record-bearing medium 20 and for detecting the passage of light through the reference record-bearing medium 21. Of course, the various lenses and lens systems are shown in simplified form. Therefore, it is intended to cover all such changes and modifications as come within the true scope and spirit of the invention.

What is claimed is:

1. In an optical system for matching a first variable opacity record-bearing medium defining a first plurality of discrete light transmissive areas with a second variable opacity record-bearing medium defining a second plurality of discrete light transmissive areas complementary to said first plurality, the arrangement comprising:

light source means for illuminating one of said record-bearing mediums;

means for imaging said one record-bearing medium on the other of said record-bearing mediums;

photosensitive means for producing an output in response to light transmitted by said other record-bearing medium; and a mask positioned between said one record-bearing medium and said means for imaging said one record-bearing medium and having a third plurality of light transmissive areas positioned to correspond to said plurality of light transmissive areas defined by said one record-bearing medium, each of said third plurality of areas being smaller than a corresponding one of said plurality of areas defined by said one record-bearing medium.

2. In an optical system for matching a first variable opacity record-bearing medium defining a first plurality of discrete light transmissive areas with a second variable opacity record-bearing medium defining a second plurality of discrete light transmissive areas complementary to said first plurality, the arrangement comprising:

light source means for illuminating one of said record-bearing mediums;

means for imaging said one record-bearing medium on the other of said record-bearing mediums;

photosensitive means for producing an output in response to light transmitted by said other record-bearing medium;

a mask positioned between said one record-bearing medium and said means for imaging said one record-bearing medium and having a third plurality of light transmissive areas positioned to correspond to said plurality of light transmissive areas defined by said one record-bearing medium, each of said third plurality of areas being smaller than a corresponding one of said plurality of areas defined by said one record-bearing medium; and diaphragm means positioned between said other record-bearing medium and said photosensitive means for reducing unwanted light reaching said photosensitive means.

3. In an optical system for matching a first variable opacity record-bearing medium defining a first plurality of discrete light transmissive areas with a second variable opacity record-bearing medium defining a second plurality of discrete light transmissive areas complementary to said first plurality, the arrangement comprising:

light source means for illuminating one of said record-bearing mediums;

means for imaging said one record-bearing medium on the other of said record-bearing mediums;

photosensitive means for producing an output in response to light transmitted by said other record-bearing medium;

a first mask positioned between said one record-bearing medium and said means for imaging said one record-bearing medium and having a third plurality of light transmissive areas positioned to correspond to said plurality of light transmissive areas defined by said one record-bearing medium, each of said third plurality of areas being smaller than a corresponding one of said plurality of areas defined by said one record-bearing medium; and a second mask positioned between said other record-bearing medium and said photosensitive means and having a fourth plurality of light transmissive areas positioned to correspond to said plurality of light transmissive areas defined by said one record-bearing medium.

4. In an optical system for matching a first variable opacity recording-bearing medium defining a first plurality of discrete light transmissive areas with a second variable opacity record-bearing medium defining a second plurality of discrete light transmissive areas complementary to said first plurality, the arrangement comprising:

light source means for illuminating one of said record-bearing mediums;

means for imaging said one record-bearing medium on the other of said record-bearing mediums;

photosensitive means adjacent said other record-bearing medium for producing an output in response to light transmitted by said other record-bearing mediums;

a first mask positioned between said one record-bearing medium and said means for imaging said one record-bearing medium and having a third plurality of light transmissive areas positioned to correspond to said plurality of light transmissive areas defined by said one record-bearing medium, each of said third plurality of areas being smaller than a corresponding one of said plurality of areas defined by said one record-bearing medium;

a second mask positioned between said other record-bearing medium and said photosensitive means and having a fourth plurality of light transmissive areas positioned to correspond to said plurality of light transmissive areas defined by said one record-bearing medium; and diaphgram means positioned between said other record-bearing medium and said photosensitive means for reducing unwanted light reaching said photosensitive means.

5. In an optical system for matching a first variable opacity record-bearing medium defining a first plurality of discrete light transmissive areas with a second variable opacity record-bearing medium defining a second plurality of discrete light transmissive areas complementary to said first plurality, the arrangement comprising:

light source means for illuminating one of said record-bearing mediums;

means for imaging said one record-bearing medium on the other of said record-bearing mediums;

photosensitive means for producing an output in response to light transmitted by said other record-bearing medium;

a first mask positioned between said one record-bearing medium and said means for imaging said one record-bearing medium and having a third plurality of light transmissive areas positioned to correspond to said plurality of light transmissive areas defined by said one record-bearing medium, each of said third plurality of areas being smaller than a corresponding one of said plurality of areas defined by said one record-bearing medium, said third plurality of light transmissive areas being positioned to correspond to all possible positions of said plurality of light transmissive areas defined by said one record bearing-medium; and a second mask positioned between said other record-bearing medium and said photosensitive means and having a fourth plurality of light transmissive areas positioned to correspond to said plurality of light transmissive areas defined by said one record-bearing medium.

6. In an optical system for matching a first variable opacity record-bearing medium defining a first plurality of discrete light transmissive areas with a second variable opacity record-bearing medium defining a second plurality of discrete light transmissive areas complementary to said first plurality, the arrangement comprising:

light source means for illuminating one of said record-bearing mediums;

means for imaging said one record-bearing medium on the other of said record-bearing mediums;

photosensitive means for producing an output in response to light transmitted by said other record-bearing medium;

a first mask positioned between said first one bearing medium and said means for imaging said one record-bearing medium and having a third plurality of light transmissive areas positioned to correspond to said plurality of light transmissive areas defined by said one record-bearing medium, each of said third plurality of areas being smaller than a corresponding one of said plurality of areas defined by said one record-bearing medium, said third plurality of light transmissive areas being positioned to correspond to all possible positions of said plurality of light transmissive areas defined by said one record-bearing medium; and a second mask positioned between said other record-bearing medium and said photosensitive means and having a fourth plurality of light transmissive areas positioned to correspond to said plurality of light transmissive areas defined by said other record-bearing medium, said fourth plurality of light transmissive areas being positioned to correspond to all possible positions of said plurality of light transmissive areas defined by said one record-bearing medium.

7. In an optical system for matching a first variable opacity record-bearing medium defining a first plurality of discrete light transmissive areas with a reference record-bearing medium defining a second plurality of discrete light transmissive areas complementary to said first plurality, the arrangement comprising:

light source means for illuminating one of said record-bearing mediums;

means for imaging said one record-bearing medium on the other of said record-bearing mediums;

photosensitive means for producing an output in response to light transmitted by said other record-bearing medium;

a first mask positioned between said one record-bearing medium and said means for imaging said one record-bearing medium and having a third plurality of light transmissive areas positioned to correspond to said plurality of light transmissive areas defined by said one record-bearing medium, each of said third plurality of areas being smaller than a corresponding one of said plurality of areas defined by said one record-bearing medium, said third plurality of light transmissive areas being positioned to correspond to all possible positions of said plurality of light transmissive areas defined by said one record-bearing medium;

a second mask positioned between said other record-bearing medium and said photosensitive means and having a fourth plurality of light transmissive areas positioned to correspond to said plurality of light transmissive areas defined by said one record-bearing medium, said fourth plurality of light transmissive areas being positioned to correspond to all possible positions of said plurality of light transmissive areas defined by said one record-bearing medium; and diapragm means positioned between said other record-bearing medium and said second mask for reducing unwanted light reaching said photosensitive means.

8. An optical system for matching a first variable opacity record-bearing medium defining a first plurality of discrete light transmissive areas with a variable opacity reference record-bearing medium defining a second plurality of discrete light transmissive areas complementary to said first plurality comprising:

light source means for illuminating one of said record-bearing mediums;

first lens means for creating an image of said one record-bearing medium on the other of said record-bearing mediums;

photosensitive means for producing an output in response to light transmitted by said other record-bearing medium;

a mask positioned between said other record-bearing medium and said photosensitive means and having a third plurality of light transmissive areas positioned to correspond to said plurality of light transmissive areas defined by said one record-bearing medium;

second lens means for creating an image of said other record-bearing medium on said mask and for forming an image of said first lens means at a position between said second lens means and said mask; and a diaphragm positioned between said second lens means and said mask at said position of said image of said first lens means for reducing unwanted light reaching said photosensitive means, said diaphragm having an aperture with a diameter smaller than the diameter of said image of said first lens means.

9. An optical system for matching a first variable opacity record-bearing medium defining a first plurality of discrete light transmissive areas with a variable opacity reference record-bearing medium defining a second plurality of discrete light transmissive areas complementary to said first plurality comprising:

light source means for illuminating one of said record-bearing mediums;

first lens means for creating an image of said one record-bearing medium on the other of said record-bearing mediums;

photosensitive means for producing an output in response to light transmitted by said other record-bearing medium;

a mask positioned between said other record-bearing medium and said photosensitive means and having a third plurality of light transmissive areas positioned to correspond to said plurality of light transmissive areas defined by said one record-bearing medium, said third plurality of light transmissive areas being positioned to correspond to all possible positions of said plurality of light transmissive areas defined by said one record-bearing medium;

second lens means for creating an image of said other record-bearing medium on said mask and for forming an image of said first lens means at a position between said second lens means and said mask; and a diaphragm positioned between said second lens means and said mask at said position of said image of said first lens means for reducing unwanted light reaching said photosensitive means, said diaphragm having an aperture with a diameter smaller than the diameter of said image of said first lens means.

10. An optical system for matching a first variable opacity record-bearing medium defining a first plurality of discrete light transmissive areas with a variable opacity reference record-bearing medium defining a second plurality of discrete light transmissive areas complementary to said first plurality comprising:

light source means for illuminating one of said record-bearing mediums;

first lens means for creating an image of said one record-bearing medium on the other of said record-bearing mediums;

photosensitive means for producing an output in response to light transmitted by said other record-bearing medium;

a first mask positioned between said one record-bearing medium and said first lens means and having a third plurality of light transmissive areas positioned to correspond to said plurality of light transmissive areas defined by said one record-bearing medium, each of said third plurality of areas being smaller than a corresponding one of said plurality of areas defined by said one record-bearing medium;

a second mask positioned between said other record-bearing medium and said photosensitive means and having a fourth plurality of light transmissive areas positioned to correspond to said plurality of light transmissive areas defined by said one record-bearing medium;

second lens means for creating an image of said other record-bearing medium on said second mask and for forming an image of said first lens means at a position between said second lens means and said second mask; and a diaphragm positioned between said second lens means and said second mask at said position of said image of said first lens means for reducing unwanted light reaching said photosensitive means, said diaphragm having an aperture with a diameter smaller than the diameter of said image of said first lens means.

11. An optical system for matching a first variable opacity record-bearing medium defining a first plurality of discrete light transmissive areas with a variable opacity reference record-bearing medium defining a second plurality of discrete light transmissive areas complementary to said first plurality comprising:

light source means for illuminating one of said record-bearing mediums;

first lens means for creating an image of said one record-bearing medium on the other of said record-bearing mediums;

photosensitive means for producing an output in response to light transmitted by said other record-bearing medium;

a first mask positioned between said one record-bearing medium and said first lens means and having a third plurality of light transmissive areas positioned to correspond to said plurality of light transmissive areas defined by said one record-bearing medium, each of said third plurality of areas being smaller than a corresponding one of said plurality of areas defined by said one record-bearing medium, said third plurality of light transmissive areas being positioned to correspond to all possible positions of said plurality of light transmissive areas defined by said one record-bearing medium;

a second mask positioned between said other record-bearing medium and said photosensitive means and having a fourth plurality of light transmissive areas positioned to correspond to said plurality of light transmissive areas defined by said one record-bearing medium;

second lens means for creating an image of said other record-bearing medium on said second mask and for forming an image of said first lens means at a position between said second lens means and said second mask; and a diaphragm positioned between said second lens means and said second mask at said position of said image of said first lens means for reducing unwanted light reaching said photosensitive means, said diaphragm having an aperture with a diameter smaller than the diameter of said image of said first lens means.

12. An optical system for matching a first variable opacity record-bearing medium defining a first plurality of discrete light transmissive areas with a variable opacity reference record-bearing medium defining a second plurality of discrete light transmissive areas complementary to said first plurality comprising:

light source means for illuminating one of said record-bearing mediums;

first lens means for creating an image of said one record-bearing medium on the other of said record-bearing mediums;

photosensitive means adjacent said other record-bearing medium for producing an output in response to light transmitted by said other record-bearing medium;

a first mask positioned between said one record-bearing medium and said first lens means and having a third plurality of light transmissive areas positioned to correspond to said plurality of light transmissive areas defined by said one record-bearing medium, each of said third plurality of areas being smaller than a corresponding one of said plurality of areas defined by said one record-bearing medium, said third plurality of light transmissive areas being positioned to correspond to all possible positions of said plurality of light transmissive areas defined by said one record-bearing medium;

a second mask positioned between said other record-bearing medium and said photosensitive means and having a fourth plurality of light transmissive areas positioned to correspond to said plurality of light transmissive areas defined by said one record-bearing medium, said fourth plurality of light transmissive areas being positioned to correspond to all possible positions of said plurality of light transmissive areas defined by said one record-bearing medium;

second lens means for creating an image of said other record-bearing medium on said second mask and for forming an image of said first lens means at a position between said second lens means and said second mask; and a diaphragm positioned between said second lens means and said second mask at said position of said image of said first lens means for reducing unwanted light reaching said photosensitive means, said diaphragm having an aperture with a diameter smaller than the diameter of said image of said first lens means.

13. An optical system for matching a first variable opacity record-bearing medium defining a first plurality of discrete light transmissive areas with a variable opacity reference record-bearing medium defining a second plurality of discrete light transmissive areas complementary to said first plurality comprising:

light source means for illuminating one of said record-bearing mediums;

an object lens for creating an image of said one record-bearing medium on the other of said record-bearing mediums;

photoelectric means adjacent said other record-bearing medium for producing an output in response to light transmitted by said other record-bearing medium;

a first mask positioned between said one record-bearing medium and said objective lens and having a third plurality of light transmissive areas positioned to correspond to said plurality of light transmissive areas defined by said one record-bearing medium, each of said third plurality of areas being smaller than a corresponding one of said plurality of areas defined by said one record-bearing medium, said third plurality of light transmissive areas being positioned to correspond to all possible positions of said plurality of light transmissive areas defined by said one record-bearing medium;

a second mask positioned between said other record-bearing medium and said photoelectric means and having a fourth plurality of light transmissive areas positioned to correspond to said plurality of light transmissive areas defined by said one record-bearing medium, said fourth plurality of light transmissive areas being positioned to correspond to all possible positions of said plurality of light transmissive areas defined by said one record-bearing medium;

a relay lens for creating an image of said other record-bearing medium on said second mask and for forming an image of said objective lens at a position between said relay lens and said second mask; and a diaphragm positioned between said relay lens and said second mask at said position of said image of said objective lens for reducing unwanted light reaching said photoelectric means, said diaphragm having an aperture with a diameter substantially smaller than the diameter of said image of said objective lens.

References Cited

UNITED STATES PATENTS

| | | | |
|---|---|---|---|
| 2,580,270 | 12/1951 | Badgley et al. | 250—219 X |
| 2,694,154 | 11/1954 | Xingsblury | 250—219 |
| 3,192,388 | 6/1965 | Wu Chen et al. | 250—219 |
| 3,248,554 | 4/1966 | Wu Chen | 250—219 X |

WALTER STOLWEIN, *Primary Examiner.*